April 29, 1952 J. J. MADDEN 2,594,949

PRESET TYPE IMPULSE-SENDER

Filed Nov. 8, 1949 2 SHEETS—SHEET 1

INVENTOR
J. J. MADDEN
BY J. MacDonald
ATTORNEY

April 29, 1952 J. J. MADDEN 2,594,949

PRESET TYPE IMPULSE-SENDER

Filed Nov. 8, 1949 2 SHEETS—SHEET 2

INVENTOR
J. J. MADDEN
BY I. MacDonald
ATTORNEY

Patented Apr. 29, 1952 2,594,949

UNITED STATES PATENT OFFICE 2,594,949

PRESET TYPE IMPULSE-SENDER

James J. Madden, Woodhaven, N. Y., assignor to Bell Telephone Laboratories, Incorporated, New York, N. Y., a corporation of New York Application November 8, 1949, Serial No. 126,097

5 Claims. (Cl. 179—90)

This invention relates to a calling device or dial of the preset type and is an improvement upon the calling device or dial disclosed in Patent No. 2,499,606, issued March 7, 1950 to D. B. Parkinson.

In the usual type telephone signaling apparatus each digit is selected and transmitted in sequence and the selection of each successive digit can not be made until the signaling pulses representing the preceding digit have been transmitted, thereby requiring an appreciable amount of time and presenting numerous opportunities for the subscriber or operator to err. Each sequence of signaling pulses representing a called number is transmitted only once, so if any error occurs in the selection or transmission, a wrong number will result. Furthermore, the usual type telephone signaling apparatus employs representations of digits comprising interruptions of direct current which must be transmitted over a direct-current circuit or an extremely low frequency transmission channel. Pulses of this type can not be transmitted directly over the usual voice frequency channels and repeaters as employed in telephone systems. Also, the usual telephone central office switching systems require the signals to be stored in expensive and complicated equipment to be subsequently transmitted to another switching center, and often this process must be repeated several times.

In said Parkinson patent a signaling system is disclosed in which the entire number to be called may be set by the subscriber or operator prior to initiating the call and in which the signals representing the number are generated at a high rate of speed. Such an arrangement reduces the time and attention required by the subscriber or operator, reduces the opportunity for error, and reduces the holding time of the equipment at the switching center, thereby materially reducing the cost of handling calls. There is also disclosed in said application signaling equipment for generating pulses suitable for transmission over voice frequency communication channels and in which the pulses representing the called number may be repeatedly transmitted without further attention on the part of the operator, thereby permitting the use of central office switching systems which complete the desired connection without requiring the signals to be stored. By generating pulses which may be transmitted over a voice frequency transmission path and repeating the entire number over and over, it is possible to transmit the number from a subscriber's station to each of the switching devices or stations necessary to extend the transmission path to the called subscriber station.

There is also disclosed signaling apparatus in said application for generating pulses in which the magnitude of each digit of the number called is represented by the time elapsing between a reference or start pulse and a stop or digit pulse. In transmitting pulses of short duration over voice frequency transmission paths, difficulty is frequently encountered due to transients set up by the pulses. The transients are usually decaying atlernating currents which are caused by resonant circuits encountered in the transmission paths, repeat coils, filters, and other transmission equipment. Transients resulting from the application of short pulses to such equipment frequently last a number of cycles and thus for an appreciable interval of time after the exciting pulse has terminated. Apparatus is provided adapted to space the signaling pulses so that ample time is allowed for the transients associated with or appearing incident to the application of each of the signaling pulses to the transmission system to die out sufficiently so that they will not interfere with the next signaling pulse. In this manner it is possible to prevent interaction between the various pulses representing the digits of the called number so that the number may be correctly received by the equipment at the central switching station.

In the said Parkinson patent means is disclosed for the generation of pulse representations of eight characters during each cycle of operation, and these pulses are repeatedly generated as long as the excitation current is applied. Any arbitrarily chosen number of representations of characters (within reasonable limits) may be generated by properly designed signaling apparatus. A maximum of eight representations of characters is used since eight-character calling numbers are in common use in telephone systems. These characters may be digits or letters or a combination of the two as commonly used in designating telephone calls. Each of the digits 0 to 9 will be repsented by a different combination of two pulses, the pulse combination representing the digit 2 will also represent the letters A, B and C; the pulse combination representing the digit 3 will also represent the letters D, E and F; and so on. Each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1 millisecond duration is in effect lengthened to a decaying alternating current of approximately 3½ milliseconds duration. At the end of this 3½ milliseconds period or any time thereafter a second pulse may be transmitted.

The signaling system comprises a start pulse of 1 millisecond duration for each character, the start pulses being generated at 12½ milliseconds intervals as long as the pulsing transformers are energized, and a stop pulse of 1 millisecond duration for each character, each stop pulse reaching its peak value during the 4 to 8½ milliseconds interval of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay only if it should occur at the end end of the ninth increment of time. Consequently, 12½ milliseconds of time elapse between the start pulses of succeeding digits, from which it follows that 12½ milliseconds is required to transmit each character designating the called number. In order to indicate the starting point of the transmission of a called number, a time interval of approximately 25 milliseconds during which no pulses are transmitted is provided at the beginning of each pulse representation of a called number. Thus, a time interval of 125 milliseconds is required to transmit each eight-digit called number and the corresponding no-signal period.

The signaling pulses are generated by saturation-type pulse generating transformers. There are eleven pulsing transformers, one for each of the digits 0 to 9 and one for the start or reference pulse. The excitation current for the apparatus is transmitted from a power station at the central office over the line which interconnects the signaling station with the central office. This current is an alternating current of sinusoidal wave form, and at the signaling station the current is passed through a phase shifting network so that the current is converted to a two-phase source in which the two currents are 90 degrees out of phase.

Each of the pulse generating transformers has a single-winding secondary and all but one of the transformers have a two-winding primary. The primary windings of the transformers are serially interconnected and connected with the two phases of the excitation current so that one phase of the excitation current is applied to one primary winding of each transformer and so that the other phase of the excitation current is applied to the other primary winding of each transformer, with the exception that the primary of the transformer which has only one primary winding is connected to only one phase of the excitation current. The secondary windings of the transformers are connected across the line in a manner which will be described.

The magnetic core of each transformer is designed to be saturated except for very small values of ampere-turns, and an electric pulse is generated in the secondary winding of each transformer when the flux is changed from saturation at one polarity to saturation at the other polarity. The flux generated in the core of the transformer with a single primary winding is in phase with the phase of the excitation current which is applied to that transformer. The flux generated in the core of each transformer with two primary windings depends upon the number of turns in the two primary windings of the transformer and upon the current flowing in each winding. The maximum value of the currents in the circuits associated with each phase is equal. Thus, the flux generated in the core of each transformer with two primary windings depends upon the number of turns in the primary windings of the transformer and upon the time-phase relationship between the currents flowing in the primary windings.

As stated, the present invention has to do only with the magnetic dialing or selector switch which the subscriber or operator presets to control the signaling equipment to transmit the proper code of signals to control the central office apparatus to establish the desired connection, and as stated this magnetic dialing switch is an improvement of the selector switch of the Parkinson patent, and is the subject of this application.

Referring to the drawings.

Figure 1:
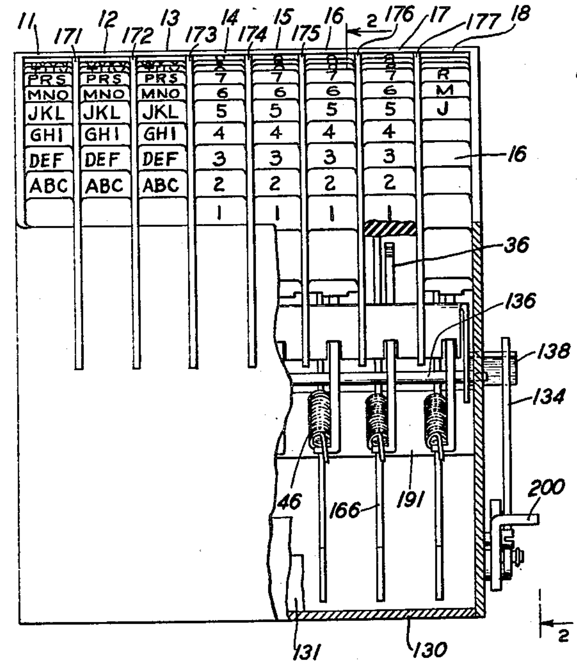
Fig. 1 is a front view, partially broken away, of the dialing apparatus.
Figure 4:
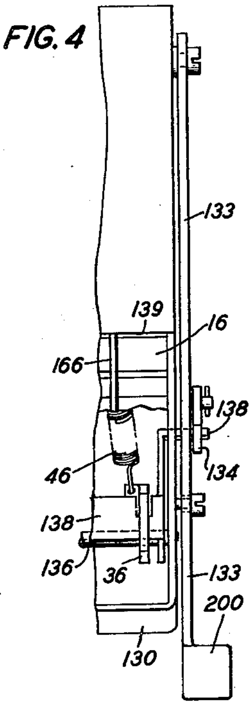
Fig. 4 is a plan view of the right-hand end of the dialing apparatus shown in Fig. 1.
Figure 3:
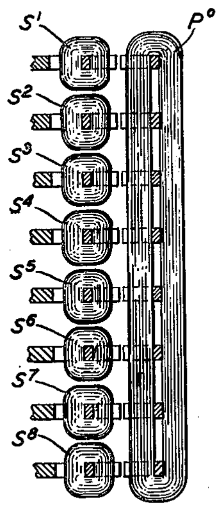
Fig. 3 is a section taken on line 3—3 of Fig. 2.
Figure 2:
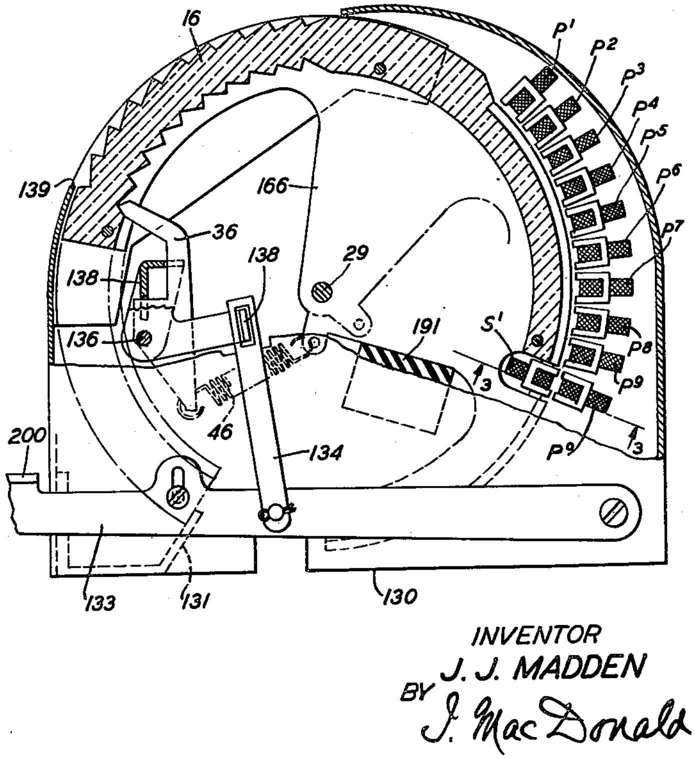
Fig. 2 is a section taken on section line 2—2 of Fig. 1.

Referring to Figs. 1, 2, 3 and 4, which illustrate the subscriber's magnetic selector switch, the switch is enclosed in a case 130, and selector dials 11 to 18 and release lever 133 thereof are accessible to the subscriber. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 2, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl 36 Figs. 1, 2 and 4 to secure each dial in one of the ten possible positions as selected by the subscriber or operator. As indicated in Figs. 1, 2 and 4, detent pawl 36, which corresponds to dial 16, is pivoted about shaft 136. Spring 46 Figs. 2 and 4 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which it may be moved. The rotary movement of the dials is limited to about one-fourth of a revolution by stop 131 and insulator 191.

Release arm 138, Figs. 1, 2 and 4, is connected with release lever 133, Figs. 1 and 4, through lever 134 and is provided with slots to engage each detent pawl. When lever 133 is in its normal position as shown in Fig. 2, arm 138 permits each detent pawl to engage with a groove in the corresponding dial. When lever 133 is depressed by pressing the thumb-piece 200 thereof, arm 138 is moved in a clockwise direction about shaft 136, Fig. 2, and the detent pawls are disengaged from the dials, thereby permitting the spring associated with each dial to cause each dial to return to its initial position.

Figure 5:
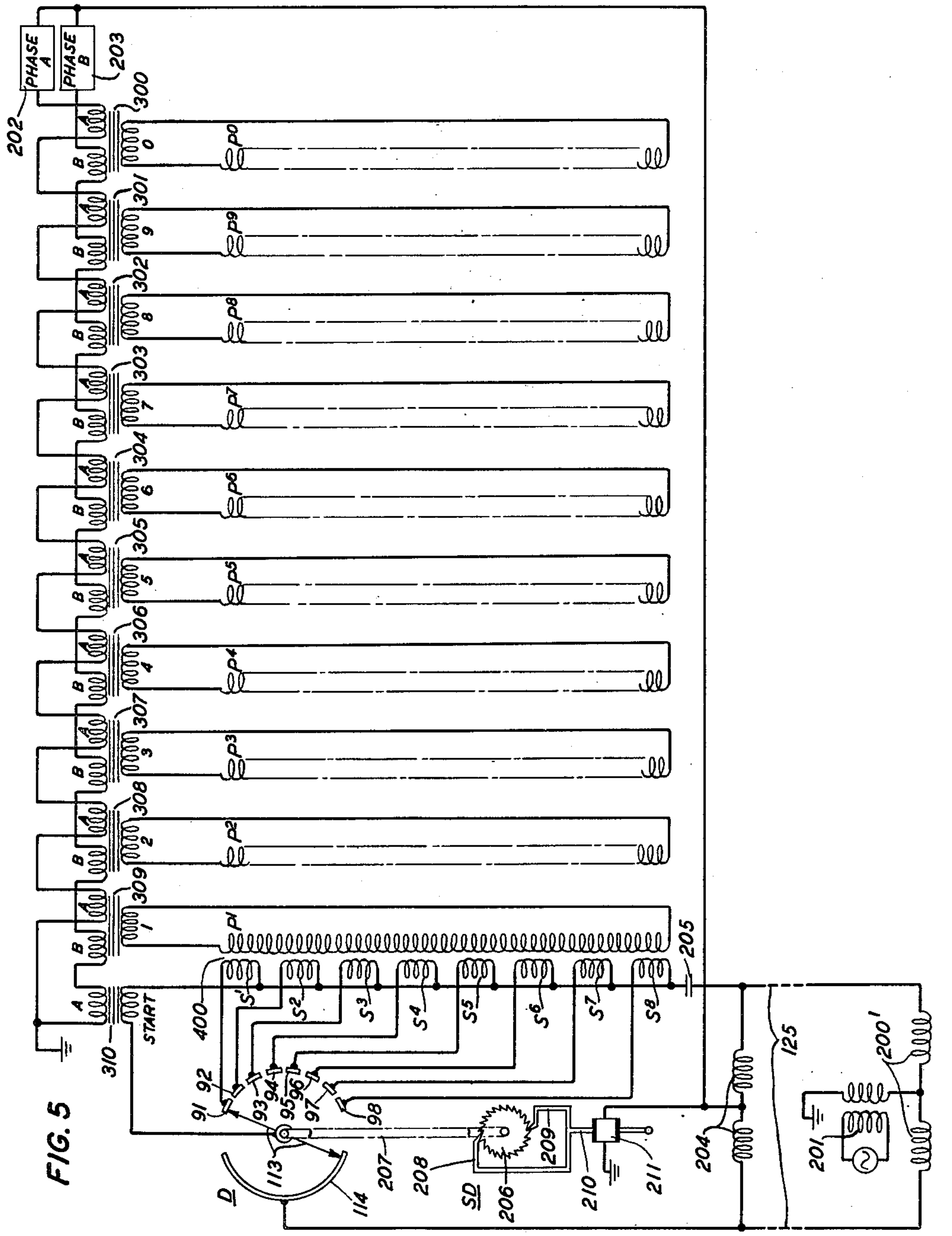
Fig. 5 is a view showing the manner in which the dials, the stepping mechanism, the pulsing transformer, the digit transformers and other equipment are interconnected to cooperate with one another and with the telephone line.

By means of this calling device a mechanical pattern, which may be varied by the subscriber, sets up the cross-points of a coordinate switch without contacts such as are used in the said Parkinson patent. This is accomplished in the following manner: The selector switch comprises a number of transformers consisting of ten fixed primary coils P-1 to P-0 (Figs. 2 and 5) and eight movable secondary coils S-1 to S-8 (Figs. 2, 3 and 5), and means for locating any secondary coil in inductive relation to any primary coil. Eight finger wheels 11 to 18 as previously described (Fig. 1) are provided for this purpose, each engraved on its periphery with the digital numbers 1, 2, . . . 0 and corresponding letters. A secondary coil S (Fig. 2) is carried by each dial. Each finger wheel moves in discrete steps. Each step corresponds to the spacing of the engraved numbers and corresponding letters. The ten primary coils P-1 to P-0, Figs. 2 and 5, are also located to correspond to the angular spacing of the engraved numbers and letters. The primary and secondary coils are arranged so that each secondary coil S-1 to S-8 may be inductively coupled to any one of the ten primary coils P-1 to P-0. Each primary coil P-1 to P-0, Fig. 5, of the subscriber's selector switch is connected to the corresponding pulse transformer secondary 300 to 309, Fig. 5. The secondary coils 300 to 309 of the selector switch are connected at certain times across the line leading to the central office by the distributor D as will be described in detail.

The stepping device SD and the distributor D are shown schematically in Fig. 5. They may be constructed as shown in the copending application of D. B. Parkinson, Serial No. 38,015, filed July 16, 1948, allowed August 16, 1949. The disclosures of said devices in said application are hereby made a part of the present application.

The distributor D comprises two brushes 113 wiping over a set of contacts 91 to 98 (Fig. 5). Contacts 91 to 98 and the segment 114 serve as distributor elements. The brushes are driven by ratchet wheel 206 through shaft 207 (Fig. 5). The ratchet wheel is driven by stepping pawls 208 and 209 (Fig. 5) which are attached to magnetic reed 210. The magnetic structure is polarized by a permanent magnet and magnetic reed 210 is actuated by coil 211. When an alternating current is applied to coil 211, the magnetic polarity of reed 210 is changed each half cycle of the alternating current, so that the reed moves both up and down during each cycle of the alternating current. Each time reed 210 moves up or down, ratchet wheel 206 is moved one step by one of the stepping pawls. Thus ratchet wheel 206 and rotor 113 are moved one step during each half cycle by the alternating current.

As shown in Fig. 5, the alternating current to energize the stepping device and provide the excitation current for the pulsing transformers is supplied through a simplex circuit. The alternating current is applied between the two line conductors 125 and ground. The interconnection between the source of alternating current and the two line conductors is simplex coil 200 having similar electrical properties to simplex coil 204. The source of alternating current is connected between the center tap of coil 200 and ground through transformer 201. Thus, the potential between the center tap of coil 204 and ground corresponds to the potential developed across the secondary of transformer 201. In this manner the alternating current to operate the stepping mechanism and to serve as the excitation current for the pulsing transformers is transmitted over the telephone line.
nected so that the A windings of the transformers are connected in series and connected to the excitation current through phase shifting network 202 and so that the B windings of the transformers are connected in series and connected to the excitation current through phase shifting network 203. The phase shifting networks are of conventional design and serve to apply an alternating current to the A windings of the transformers which is displaced 90 degrees in time-phase relationship from the alternating current applied to the B windings of the transformers. Transformers 300 to 309 contain two primary windings and these transformers serve to generate the stop or digit pulses. Transformer 310 has one primary winding and serves to generate the reference or start pulses.

As discussed hereinbefore, each of the transformers 300 to 310 is designed so that its core is saturated except for very small values of flux. The flux in the core increases to its maximum or saturation in one direction and remains constant as the current in the primary increases positively from zero. When the current in the primary decreases, the flux remains constant until the current is such that the flux is smaller than the saturation value, at which time the flux decreases. As the current goes through zero and increases negatively the flux continues to change until it again reaches the saturation value. Whenever this flux change occurs, a pulse is generated in the secondary. In this way since the primary winding of transformer 310 is connected only to network 203, two start or reference pulses are generated during each cycle of the excitation current from network 203.

The flux generated in a transformer, up to saturation of the core, is proportional to the total number of ampere-turns of the primary windings. Each transformer 300-309 is supplied by networks 202 and 203 which furnish currents out of phase; therefore the time at which the flux in each transformer changes, and a pulse is generated, is governed by the number of turns in each primary winding.

The primary windings of each of the transformers 300 to 309 are proportioned so that each transformer generates a stop pulse corresponding to the digit assigned to that transformer. Thus, each of these transformers generates a pulse which reaches its peak value at a time after the 4½ milliseconds interval assigned to stop or digit pulses and there is a ½ millisecond time interval between the peak values of each pulse generated.

During the time that the excitation current is applied to the pulsing transformers a pulse is generated in the secondary of each of the transformers during each half cycle of the excitation current. In order to apply the pulses to line 125 in conformity with the called number which it is desired to transmit, selector switch 130 and the distributor D are employed to interconnect the transformers with the line.

The secondary of transformer 310 is connected across line 125 through condensers 205 and rotor 113 of the distributor. The distributor is constructed so that during each cycle of operation, rotor 113 connects with line 125 through conductor 114 during the time required for stepping wheel 206 to move eight steps, and so that rotor 113 is not connected with the line during the time required for stepping wheel 206 to move two steps. In this manner the secondary of transformer 310 is repeatedly connected across line 125 during 100 milliseconds intervals and each interval during which the transformer is disconnected is 25 milliseconds in duration. Since a start or reference pulse is generated in transformer 310 at 12½ milliseconds intervals, it follows that eight start pulses are impressed across line 125 during each 100 millisecond interval in which rotor 113 connects with conductor 114.

The secondaries of transformers 400 to 408 are connected across line 125 through condenser 205 and through the distributor segments D. The distributor is designed so that rotor 113 connects with each of the conducting segments 91 to 98 during each half rotation. The segments are positioned so that the rotor steps from one segment to the next each time the stepping wheel 206 moves one step, and during each half rotation the rotor does not contact any of the segments during a 25 milliseconds interval. Thus, during eight 12½ milliseconds intervals the rotor successively connects with all of the segments.

Since each segment 91 to 98 is connected with a secondary $S^1$ to $S^8$ representing the eight digits, and since each such secondary may be moved by the corresponding dial into inductive relation with any primary $P^1$ to $P^0$ representing the numbers 0 to 9 and the corresponding letters, the secondaries $S^1$ to $S^8$ are selectively connected across the line during the intervals which rotor 113 connects with conducting segments 91 to 98, or in other words, all secondaries may be so positioned with respect to the primaries P as to cause the rotor to transmit the code of the desired called number each time the brushes 113 traverse the segments.

In using the signaling apparatus the subscriber or operator will first position dials 11 to 18 so that the number to be called appears on a horizontal line 139 slightly above the front face of case 130. It is to be observed that the subscriber has the number before him at all times and may check it and, if necessary, change it at any time.

The signaling apparatus disclosed herein may be used as part of a subscriber's telephone station or as part of a central office operator's equipment. Ordinarily it will be desirable to interpose a manually operable switch between the apparatus as disclosed and the telephone line. This switch would serve to place the station in condition to receive a call when in its normal position, and to place the station in condition to generate and transmit signaling pulses when in its operated position. It is apparent that the selector switch 130 could be modified so as to include a telephone handset cradle and switch of conventional design. In this case the switch would be in its normal unoperated condition while the handset is resting in its cradle, and it would be operated when the handset is removed.

At the completion of the call or before the next call is made the dials are returned to their normal position as indicated in Fig. 1 by pressing release lever 133. After this has been done the apparatus is again in condition to be positioned and operated as discussed above.

The manner in which the apparatus disclosed in this application may be incorporated in a complete telephone system is disclosed in copending application Serial No. 35,925, filed June 29, 1948 by W. A. Malthaner. Suitable types of equipment for responding to the signaling pulses transmitted from the apparatus disclosed herein are disclosed in the copending applications of H. E. Vaughan, Serial No. 35,911, filed June 29, 1948 and W. A. Malthaner, N. D. Newby and H. E. Vaughan, Serial No. 35,924, filed June 29, 1948.

Substation signaling devices for accomplishing a similar purpose are disclosed in copending application Serial No. 35,930, filed June 29, 1948 by D. B. Parkinson, Serial No. 35,927, filed June 29, 1948, now Patent No. 2,588,397, granted March 11, 1952 by C. A. Lovell et al. and Serial No. 35,926, filed June 29, 1948, now Patent No. 2,587,635, granted March 4, 1952, by C. A. Lovell and D. B. Parkinson. Reference may be made to application Serial No. 35,930 of D. B. Parkinson for a more detailed description of the time relationship between the various pulses.

What is claimed is:

1. In an automatic telephone system using signal arrangements in which each digit of the number dialed is represented by the time elapsing between a start or reference pulse and a stop pulse generated by a pulse transformer, the combination with said system of a dialing switch comprising a number of transformers consisting of primary coils and secondary coils, the primary coils being fixed and the secondary coils being movable, and manually operable means for locating any secondary coil inductively opposite any primary coil whereby the number to be dialed will be preset.

2. In an automatic telephone system using signal arrangements in which each digit of the number dialed is represented by the time elapsing between a start or reference pulse and a stop pulse generated by a pulse transformer, the combination with said system of a dialing switch comprising a predetermined number of transformers consisting of a predetermined number of primary and secondary coils, the primary coils being fixed and the secondary coils being movable, and manually operable means for locating any secondary coil in inductive relation to any primary coil, whereby a mechanical pattern is set up in a similar manner to the cross-points of a coordinate switch whereby the number to be dialed will be preset.

3. In an automatic telephone system using signal arrangements in which each digit of the number dialed is represented by the time elapsing between a start or reference pulse and a stop pulse generated by a pulse transformer, the combination with said system of a dialing switch comprising a number of transformers corresponding to the number of digits to be dialed, each transformer consisting of a number of primary coils corresponding to the numerals 1 to 0, and a number of secondary coils corresponding to the number of digits to be dialed, the primary coils being fixed and the secondary coils being movable, and manually operated means for locating any secondary coil inductively opposite any primary coil whereby the number to be dialed will be preset.

4. In an automatic telephone system using signal arrangements in which each digit of the number dialed is represented by the time elapsing between a start or reference pulse and a stop pulse generated by a pulse transformer, the combination with said system of a dialing switch comprising a number of transformers corresponding to the number of digits to be dialed, each transformer consisting of a number of primary coils corresponding to the numerals 1 to 0, and a number of secondary coils corresponding to the number of digits to be dialed, the primary coils being fixed and the secondary coils being movable, and manually operated means for locating any secondary coil inductively opposite any primary coil to preset the number to be dialed, said means consisting of a number of rotatable finger wheels corresponding to the number of digits to be dialed and having on their peripheries the digital numbers and letters, and adapted to be moved in steps, each step corresponding to the spacing of the digital numbers, and the primary coils being mounted to correspond with the angular spacing of the digital numbers.

5. In an automatic telephone system having a central office and a source of two-phase alternating current thereat and using signal arrangements in which each digit of the number dialed is represented by the time elapsing between a start or reference pulse and a stop pulse generated by a pulse transformer, the combination with said system of a dialing switch comprising eight transformers having ten fixed primary coils and eight movable secondary coils, and manually operable means for locating any secondary coil inductively opposite any primary coil, a distributor having segments, the said secondary coils being connected at one end to one side of said source and at the other ends to said segments of said distributor which is driven from said source of power, and having a pair of brushes one sweeping over the segments and the other over a collector segment connected to the other side of said power source, the distributor brushes in sweeping over the segments repeatedly at a high rate of speed transmitting and repeating the coded signal of the dialed number as long as desired.

JAMES J. MADDEN.

REFERENCES CITED

The following references are of record in the file of this patent:

UNITED STATES PATENTS

| Number | Name | Date |
|---|---|---|
| 548,406 | Thomson | Oct. 22, 1895 |
| 2,189,819 | Somes | Feb. 13, 1940 |
| 2,386,486 | Mallina | Oct. 9, 1945 |
| 2,499,606 | Parkinson | Mar. 7, 1950 |